United States Patent [19]

Fisher

[11] Patent Number: 4,852,206

[45] Date of Patent: Aug. 1, 1989

[54] AERODYNAMIC WINDSHIELD WIPER

[75] Inventor: Brian A. Fisher, Burlington, Canada

[73] Assignee: Tridon Limited, Oakville, Canada

[21] Appl. No.: 78,730

[22] Filed: Jul. 28, 1987

[30] Foreign Application Priority Data

Feb. 10, 1987 [CA] Canada ................................. 529424

[51] Int. Cl.$^4$ ............................................... B60S 1/04
[52] U.S. Cl. .................................................. 15/250.42
[58] Field of Search ...................................... 15/250.42

[56] References Cited

U.S. PATENT DOCUMENTS

| | | | |
|---|---|---|---|
| 3,317,946 | 5/1967 | Anderson | 15/250.42 |
| 4,309,790 | 1/1982 | Bauer | 15/250.42 |
| 4,570,284 | 2/1986 | Verton | 15/250.42 |

FOREIGN PATENT DOCUMENTS

| | | | |
|---|---|---|---|
| 1035798 | 7/1966 | Canada | 15/250.42 |
| 3119702 | 1/1982 | Fed. Rep. of Germany | 15/250.42 |

Primary Examiner—Philip R. Coe
Assistant Examiner—K. O'Leary
Attorney, Agent, or Firm—Rogers & Scott

[57] ABSTRACT

The invention provides a windshield wiper superstructure which is shaped to interact with an oncoming air stream so as to divert a component of force of such an air stream downwardly and toward the windshield, thereby to counteract any tendency for the wiper to lift in adverse aerodynamic conditions. The spine of the superstructure is inclined and defines a varying angle of attack to air flowing over the superstructure. Preferably, the angle of attack is maximized at joints between a central primary yoke and a pair of depending secondary yokes connected to distribute pressure from a wiper arm to a squeegee.

8 Claims, 4 Drawing Sheets

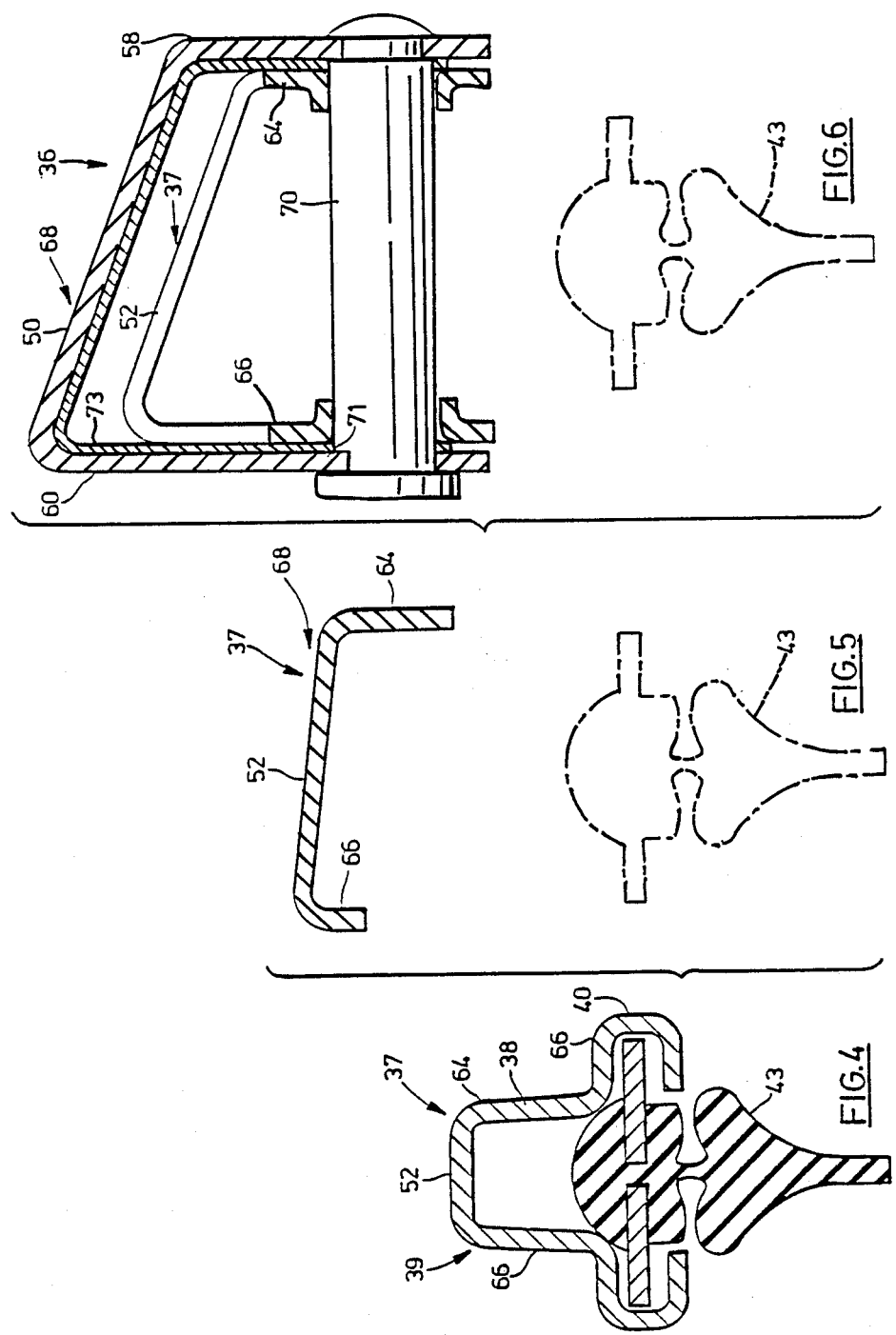

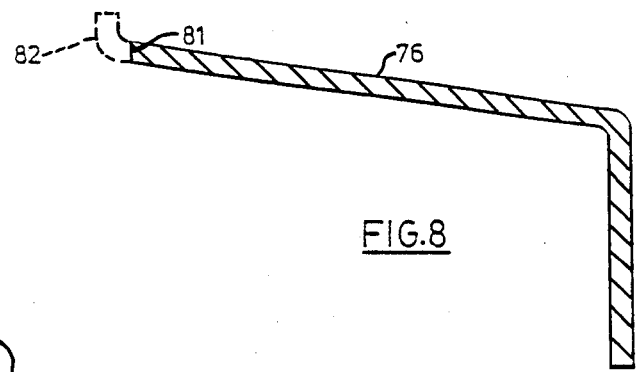
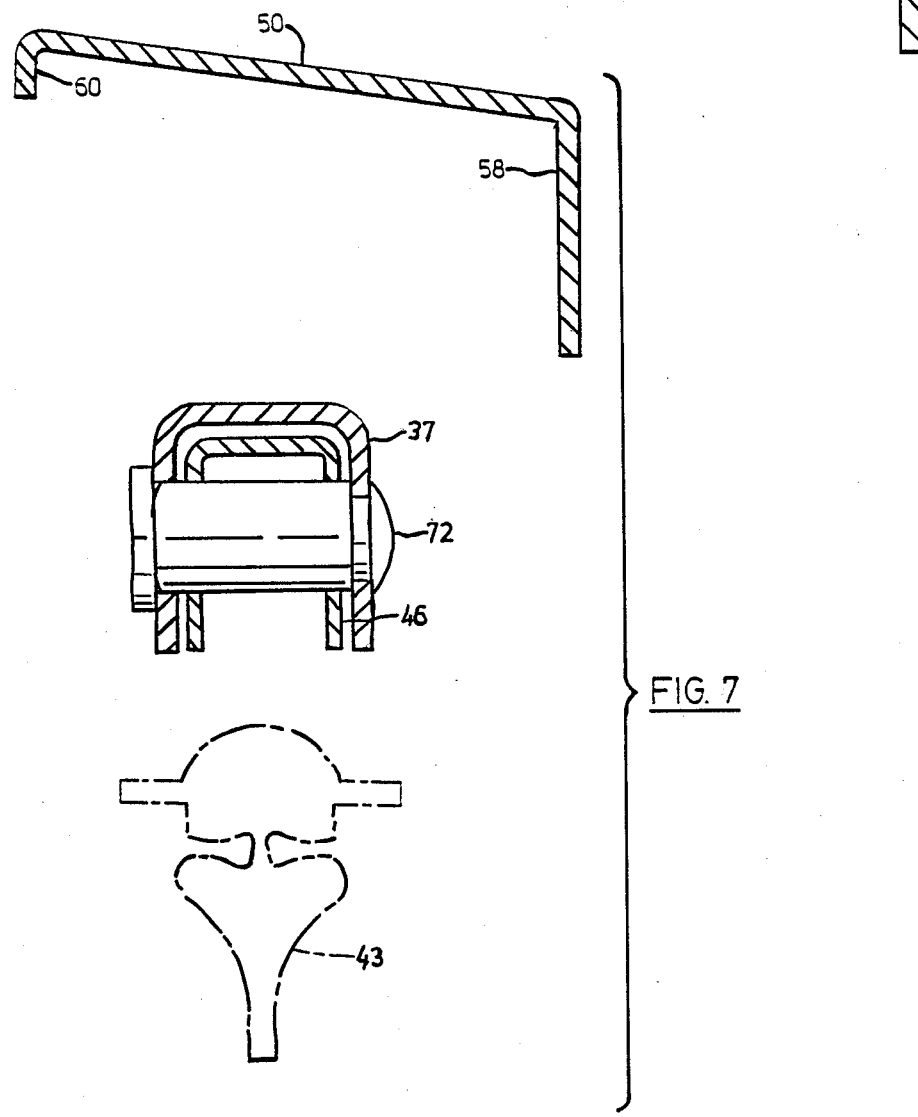

AERODYNAMIC WINDSHIELD WIPER

This invention relates to windshield wipers and more particularly relates to a pressure distributing superstructure for use in such windshield wipers. The superstructure connects a squeegee for wiping the windshield of a vehicle to a driven wiper arm on the vehicle for reciprocating the squeegee over the windshield. The superstructure is shaped such that an oncoming air stream resulting from forward movement of the vehicle may be partly deflected as it passes over the windshield so as to produce a force which is normal to the windshield and which reduces the natural tendency for the wiper to be lifted off the windshield by the passage of air about the wiper.

It is well known that a fast moving vehicle such as an automobile produces a draught of oncoming air which flows upwardly and around the windshield and which is capable of creating a lifting force on the windshield wiper which counters the spring force normally used to hold the wiper in contact with the windshield. The lifting force tends to cause the wiper to "skip" over the windshield resulting in a poor and unacceptable wipe quality. Such a condition is clearly undesirable and several devices have been developed to counter the problem and promote better contact between a windshield wiper squeegee and the windshield.

The most obvious approach to solving the problem is simply to use a stronger spring in the arm to hold the wiper against the windshield. This, however, would cause more problems than it would solve. The force used to hold the squeegee on the windshield cannot be too large otherwise the power needed to drive the wiper at slower road speeds and light or intermittent rain would be excessive. Further, the necessary reversal of the tipping angle of the squeegee would not take place because the load would hold the squeegee in one position as the wiper oscillated and the wiping action would be unacceptable. Consequently, any solution to windage problems must begin with the premise that the geometry and force relationships normally needed for slower speeds and light or intermittent rain must first be satisfied and the solution complement these requirements.

Another approach is to produce a windshield wiper having a profile which tends to break up the lifting force of the draft. The required profile may be intrinsic to the superstructure or may be achieved by attaching (either temporarily or permanently) suitably shaped appendages either to the superstructure or to the wiper arm adjacent to the superstructure. Devices of the former type tend to terminate in sharp edges which produce turbulence while others, because of the angular disposition of the major surfaces of the superstructure, require ungainly attachment means for connection to the wiper arm. Such connections obstruct vision, and moreover, are not very aesthetic. They contribute to increasing the wind resistance and they are difficult to conceal when parked.

Structures of the latter type are usually added to existing designs of wiper. They tend to be unsightly and bulky and may often be associated with significant power loss due to the production of undesirable turbulence, particularly at the edges. Apart from the actual power used, structures of this type are undesirable for use in modern automobiles because designers are attempting to minimize both cost and weight. A motor required to provide less power would be lighter and less costly to make.

Still another approach is to produce a windshield wiper in which the superstructure has an aerodynamically neutral profile. An example of such a structure has members of which the cross-section is substantially circular. This has the effect of substantially reducing any lifting force arising from an oncoming air flow interacting with the wiper superstructure but has no effect on reducing or counteracting any lifting force arising from the interaction of such air flows on the wiper refill or squeegee.

As a result of such residual forces interacting with the squeegee, there continues to be a tendency for the wiper to lift in adverse aerodynamic conditions. One way to resolve this problem is to provide a stronger spring load in the arm. This solution, however, as explained above, is also undesirable.

The object of this invention is to provide a windshield wiper which is adapted by its profile to remain on a windshield when faced by an oncoming air stream and in which the width and height proportions of the wiper are similar to those of a standard windshield wiper. It is also an object to provide an aesthetically pleasing wiper which can be driven in all conditions by lighter and less costly motors.

Pressure distribution over the length of a wiper is also an important consideration. Windshields are curved so that as the wiper oscillates the squeegee must adjust continuously to remain in contact with the changing profile of the glass in contact with the squeegee. The most likely place for separation to start is at the ends due both to load distribution problems and also to aerodynamic end effects at the tips of the squeegee.

Clearly, any shape which is to overcome the problem of draught induced lift must address the problem of providing loading on the wiper which is distributed to ends of the wiper and which also has ends which are as aerodynamically transparent as possible.

Accordingly, it is also an object of the present invention to provide a wiper structure which distributes wind loading to enhance the reaction load distribution over the length of the squeegee and which tends to retain the edge of the squeegee in contact with the windshield.

According to one aspect of the invention, a superstructure is provided for operatively connecting a squeegee to a wiper arm to distribute pressure applied by the wiper arm during such movement. The superstructure is characteristized by a spine inclined to define a varying angle of attack to air flowing over the superstructure. Preferably, the superstructure has a substantially channel shaped section extending longitudinally and formed by the spine and at least one leading flange. The spine lies transverse to said at least one leading flange and forms a minimum angle with it in a central portion of the superstructure and in oppositely directed end portions of the superstructure. Between said central portion and said end portions, the spine and leading flange subtend an obtuse angle which gradually changes in magnitude along the length of the superstructure and defines a maximum angle in a portion of the superstructure where maximum downward pressure on the squeegee towards the windshield is desirable for optimum retention of the squeegee on the windshield.

The invention is further described below with reference to two embodiments illustrated in the accompanying drawings in which:

FIGS. 4 to 7 are sectional views drawn respectively on lines 4—4, 5—5. 6—6 and 7—7 of FIG. 2 to a larger scale;

FIG. 8 is a view similar to FIG. 7 and illustrating an alternative embodiment of the invention; and FIG. 9 (drawn adjacent FIG. 1) is an end view of the windshield wiper of FIG. 2 drawn to a larger scale.

Figure 1:
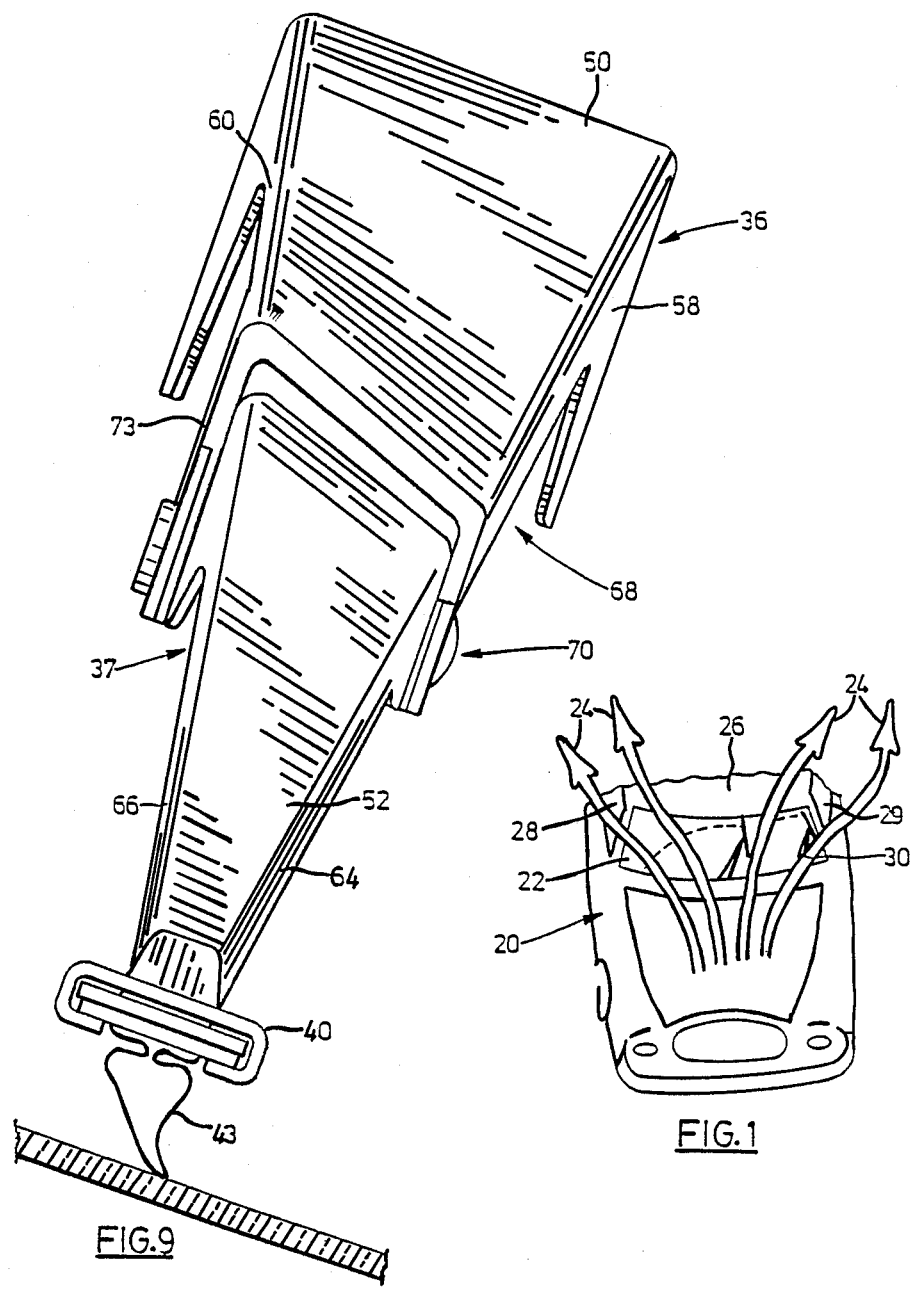
FIG. 1 is a schematic perspective view illustrating a pair of conventional windshield wipers operably positioned on an automobile windshield.

Referring firstly to FIG. 1, a forwardly moving vehicle is shown designated generally by numeral 20 and having a windshield 22 over which an oncoming air stream passes in the general direction of the arrows 24. At the center of the vehicle 20, the air stream tends to flow over the windshield 22 and upwardly over the roof 26. Between the center of the vehicle and the sides 28, 29 the air stream is progressively diverted so that a large proportion of the air stream flows towards the sides 28, 29 of the vehicle. The side 29 (which in this example is the driver's side) has a conventional windshield wiper 30 which is operably positioned to sweep the path of vision delimited by ghost outline so as to afford maximum vision to the driver. It will be appreciated that as the windshield wiper 30 sweeps across the windshield 22, the prevailing air stream is intercepted in substantially all positions, so that air will flow over and around the wiper continuously when the wiper is in use and the vehicle is moving.

Figure 2:
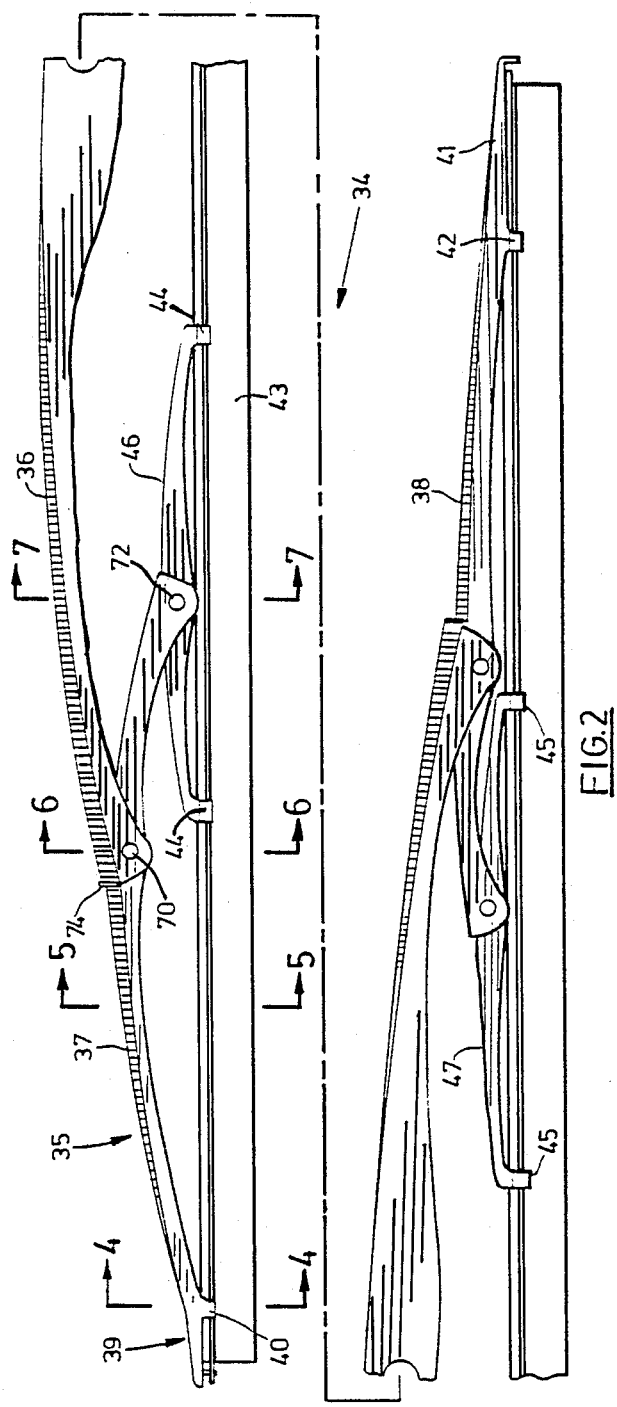
FIG. 2 is a side view of a preferred embodiment of a windshield wiper according to the invention, the view being in two parts to allow for use of a larger scale.

The profile of a windshield wiper 34 according to this invention and illustrated in FIG. 2 is adapted to cause an interaction between the wiper and the prevailing air flow to improve the windshield wiper performance. In this view, a windshield wiper 34 according to a preferred embodiment of the invention has a longitudinally extending pressure distributing superstructure 35 comprising a curved primary yoke 36 and a pair of opposed and curved secondary yokes 37, 38 pivotally connected intermediate their ends to the ends of the primary yoke 36. The operative outer end portions 39, 41 of the secondary yokes 37, 38 have respective pairs of claws 40, 42 adapted to receive and retain a squeegee 43 in an operative position in conventional fashion. Two pairs of additional claws 44, 45 are provided on each of two tertiary yokes 46, 47 for supporting the squeegee 43. These yokes are pivotally connected between their ends to an inner end portion of the respective secondary yokes 37, 38. This articulated configuration for a pressure distributing superstructure is well known in principle.

Figure 3:
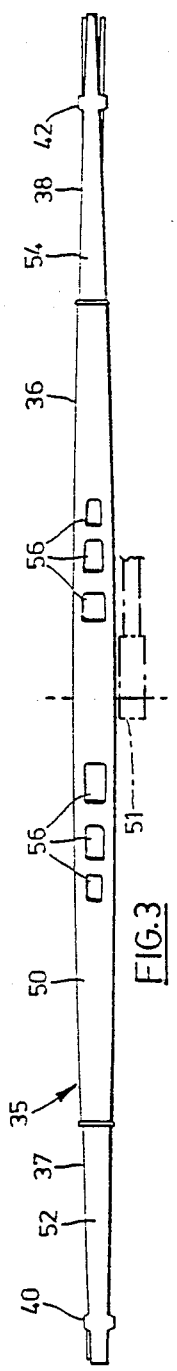
FIG. 3 is a top view of the wiper of FIG. 1 drawn to a smaller scale than that used for FIG. 2.

As seen in FIG. 3, the superstructure 35 is normally attached to a wiper arm 51 (shown in ghost outline) at a central portion of the primary yoke 36. The connection is conventional using a side mounting pin which reduces the height of the overall windshield wiper structure. The result is aesthetically pleasing and contributes to reducing any turbulence from intercepted air streams.

The primary yoke 36 has a spine or base 50 defining a plurality of vent apertures 56 in two sets spaced longitudinally about the centre of the yoke. Each set has three apertures of decreasing cross-sectional area (as they extend outwardly) to match the width of the spine which becomes narrower towards the ends. The vent apertures 56 are adapted to release any increase in air pressure on the underside of the primary yoke so as to counter lifting created by the oncoming air stream.

An aerodynamic profile is imparted to the superstructure 35 by varying the inclination of the spine 50 of the primary yoke 36 and of the spines 52, 54 of the secondary yokes 37, 38 relative to respective leading flanges 58, 64 and trailing flanges 60, 66 as will be described.

Reference is next made to FIG. 4 which is a section on line 4—4 of FIG. 2. This figure illustrates the end portion 39 of the secondary yoke 37. It will be seen that the claws 40 are dependent from a generally channel shaped section including the spine 52 and leading and trailing flanges 64, and 66 respectively. The attachment to the squeegee is conventional and in this view it will be seen that the spine is generally at right angles to the flanges 64, 66 which are of similar height. Further along the secondary yoke is section 5—5. Here it will be seen that the spine 52 is now wider and is angled towards the direction of air shown by arrow 68. The trailing flange 66 is shorter than the leading flange 64 which remain generally parallel to one another. The direction of air stream 68 is taken for the purposes of description to be in the path of movement of the wiper, and in this example, to be at right angles to the leading flange 64. The included angle between this air path and the top surface of the spine 52 will be termed the "angle of attack". The result is that when the car is moving and the wipers are in use, there is a component of force created by the reaction with the wind which tends to push the spine 52 and hence the whole structure downwardly towards the windshield to hold the squeegee 43 on the windshield.

Moving from section 5—5 to section 6—6, it will be seen that the primary yoke 36 is attached to the secondary yoke 37 at a rivet pin 70 which lies transversely to the longitudinal axis of the superstructure 35 and the squeegee 43. Load on the primary yoke is transferred through the rivet pin 70 to the secondary yoke 62 and hence of course to the tertiary yoke as is common in the art. The primary yoke 36 is at this point shaped as shown where the spine 50 defines an angle of attack to wind direction 68 as illustrated. At this point, the trailing flange 60 is longer than the leading flange 58 due to the fact that the flanges must be matched to accommodate the rivet pin 70. Similarly, the flanges 64 and 66 on the secondary yoke 37 are matched to accommodate the pin 70. Again, it will be evident that because of the angle of attack of air stream 68 on the spine 50, there will be a downward force on the primary yoke resulting from the impact of wind on this surface.

As indicated above, it is desirable that the wiper structure distribute wind loading to enhance the reaction load distribution over the length of the squeegee. The construction of the joint between the primary and secondary yokes is instrumental in achieving this. The rivet pin 70 accordingly features a shoulder 71 dimensioned to allow the required pivotal movement between the yokes without affording too much play. A bushing 73 positioned between the yokes ensures a snug fit and has an outwardly extending lip 74, illustrated in FIG. 1. In use, the lip 74 conveniently covers the adjacent end of the primary yoke 36 and hides any imperfections such as incomplete painting of a metal yoke. (This is not an uncommon problem as the yoke blank will usually be one of several stamped at once and supported at their ends during painting and prior to subsequent separation and forming. The supporting portion will then be left bare unless a subsequent painting step is employed.

Turning now to FIG. 7, this view represents a section of the primary yoke between the rivet pin 70 and the central portion of the yoke where it meets the connection with the arm 51 (FIG. 3). As seen in FIG. 7, the spine 50 continues to be angled with respect to the wind, but the angle has changed. The change in the angle is better seen in FIG. 9 which is a view looking from the end of the wiper. It will be seen that the spine 50 at its center is generally at right angles to the flanges 58 and 60 and that it changes in relation to these flanges as it extends to the pin 70. Maximum angle of attack is as drawn in FIG. 6 at the pin and in FIG. 7 the angle is reduced. Returning to FIG. 7, in this section the leading flange 58 is significantly longer than the trailing flange 60 to reduce lift and maximize the efficiency of the angled spine. Similarly, as seen in FIG. 9, the maximum angle of attack to wind direction 68 defined by the spine 52 of the secondary yoke is at the pin 70 and this angle gradually diminishes towards the claws 40 where there is no angle of attack. FIG. 7 also shows the connection between the secondary yoke 37 and the tertiary yoke 46 using a pin 72.

It will be evident at this stage that the angle of attack is a maximum around the pin 70 where the maximum downward force is required for transmission via the secondary and tertiary yokes to the squeegee. At the center of the primary yoke 36, there is no angle of attack. This shape minimizes the overall height of the wiper. Also, this part, which has the greater cross-sectional width for strength reasons, is relieved by the apertures 56 shown in FIG. 3, so that any pressure build up under this portion will be relieved. Consequently, the center is a neutral zone where there is a minimum of lift and no designed downward force. As a result, the pressure distribution caused by the wind is such that there is minimal lift and maximized downward force where it is required for distribution to the squeegee.

The angle of attack varies but has a maximum which preferably ranges from 18 to 22 degrees at the rivet pin 70.

Reference is now made to FIG. 8 which illustrates two minor variations which are within the scope of the invention. This drawing is equivalent to the upper part of FIG. 7 to illustrate a spine 76 having a leading flange 80 at the same section as that of FIG. 7 on a different embodiment. In the first variation, it is noticeable that the trailing edge of the spine delimited by said line 81 has no flange. This is desirable for minimizing possible lift caused by wind under the spine but of course reduces the rigidity of the spine. For this reason, the structure shown in FIG. 7 would be preferable for lighter guage materials but given that the guage could provide sufficient strength, the FIG. 8 structure would be satisfactory.

Alternatively, a second variation of the invention provides for the spine 76 to have an upwardly directed flange 82 as indicated in ghost outline. Depending on the magnitude of the angle of attack, which during road use is at least partly defined by the wiper position relative to the windshield, in addition to the inclination of the spine, such an upward flange 82 may contribute toward increasing the component of force of an oncoming air stream which tends to push the spine 76 downwardly towards the windshield. Conveniently, the upward flange 82 also increases the rigidity of the spine 76.

Still another variation within the claimed scope of the invention is to provide an inclined spin having deformation formed in either the upper or lower surface and adapted to improve the structural rigidity of the spine. Where such deformations are provided in the upper surface of a spine, they may improve its appearance and, by suitable design, they need not unduly increase any tendency to produce turbulence.

It is clear that the invention provides a structure suitable for use on vehicles to minimize the tendency for the structure to lift and remove the squeegee from the windshield. Further, this has been achieved without significantly affecting the size of the superstructure which of course should be kept to a minimum for reasons of safety and adequate visibility for the driver. The resulting structure is not only useful and efficient but it also has aesthetic appeal which enhances the desirability of the vehicle carrying the wipers.

Variations in the structure are within the scope of the invention as claimed and will include a primary yoke in which the central zone of the spine is inclined so as to define an angle of attack of tangible magnitude as well as yokes having neither a leading nor a trailing flange.

The embodiments of the invention in which an exclusive property or privelege is claimed are defined as follows:

1. A windshield wiper superstructure comprising a first yoke having a centrally located attachment means for connection to a wiper arm and ends, the first yoke having a spine on the top surface of the yoke defining a varying angle of attack to air flowing over the first yoke, the angle of attack being a maximum at the ends of the first yoke and a minimum at the center of the first yoke.

2. A windshield wiper as claimed in claim 1 in which the spine defines apertures adjacent to and at either side of the central portion.

3. A windshield wiper as claimed in claim 1 and further comprising a pair of secondary yokes attached one to each of the ends of the first yoke, the secondary yokes including spines and at least one of the secondary yoke spines defines a varying angle of attack to said air, the angle of attack being a maximum at the junction with the first yoke and a minimum at the outer end of the secondary yoke.

4. A windshield wiper according to claim 3 in which the first yoke defines leading and trailing parallel flanges attached one to either side of the spine.

5. In a windshield wiper having a longitudinal axis, a longitudinally extending squeegee for wiping a windshield, and a longitudinally extending pressure distributing superstructure comprising a first yoke having ends attached to secondary yokes and central attachment means for attaching the wiper to a wiper arm operatively connected to the squeegee and driven in use by the wiper arm to reciprocate the squeegee over the windshield, the improvement in which the first yoke has a cross-section formed by a spine on the top surface of the yoke and a leading flange lying substantially parallel to the longitudinal axis, the spine being at a minimum angle of no less than a right angle to the flange adjacent the central attachment means and changing progressively towards the ends to define a maximum angle of attack with respect to air flow meeting the first yoke at substantially right angles to thereby provide a downward component of force caused by impact of the air with the first yoke to hold the wiper on the windshield.

6. A structure as claimed in claim 5 in which the first yoke further includes a trailing flange substantially parallel to the first flange and at the opposite side of the spine.

7. A structure as claimed in claim 5 in which the spine defines apertures adjacent to and to either side of the central attachment means.

8. A structure as claimed in claim 5 in which the secondary yokes include portions extending from the first yoke outwardly ending in claws to attach the squeegee, these portions having spines defining a maximum angle of attack at the junction with the first yoke and progressively changing to a minimum angle of attack at the claw.

* * * * *